July 5, 1960 L. W. FALK ET AL 2,943,504
MARINE REDUCTION GEAR TRANSMISSION
Filed Sept. 3, 1957 6 Sheets-Sheet 1

INVENTOR.
Louis W. FALK &
BY William S. RICHARDSON

Attorneys

July 5, 1960     L. W. FALK ET AL     2,943,504
MARINE REDUCTION GEAR TRANSMISSION
Filed Sept. 3, 1957     6 Sheets-Sheet 3

*INVENTOR.*
Louis W. FALK &
BY William S. RICHARDSON

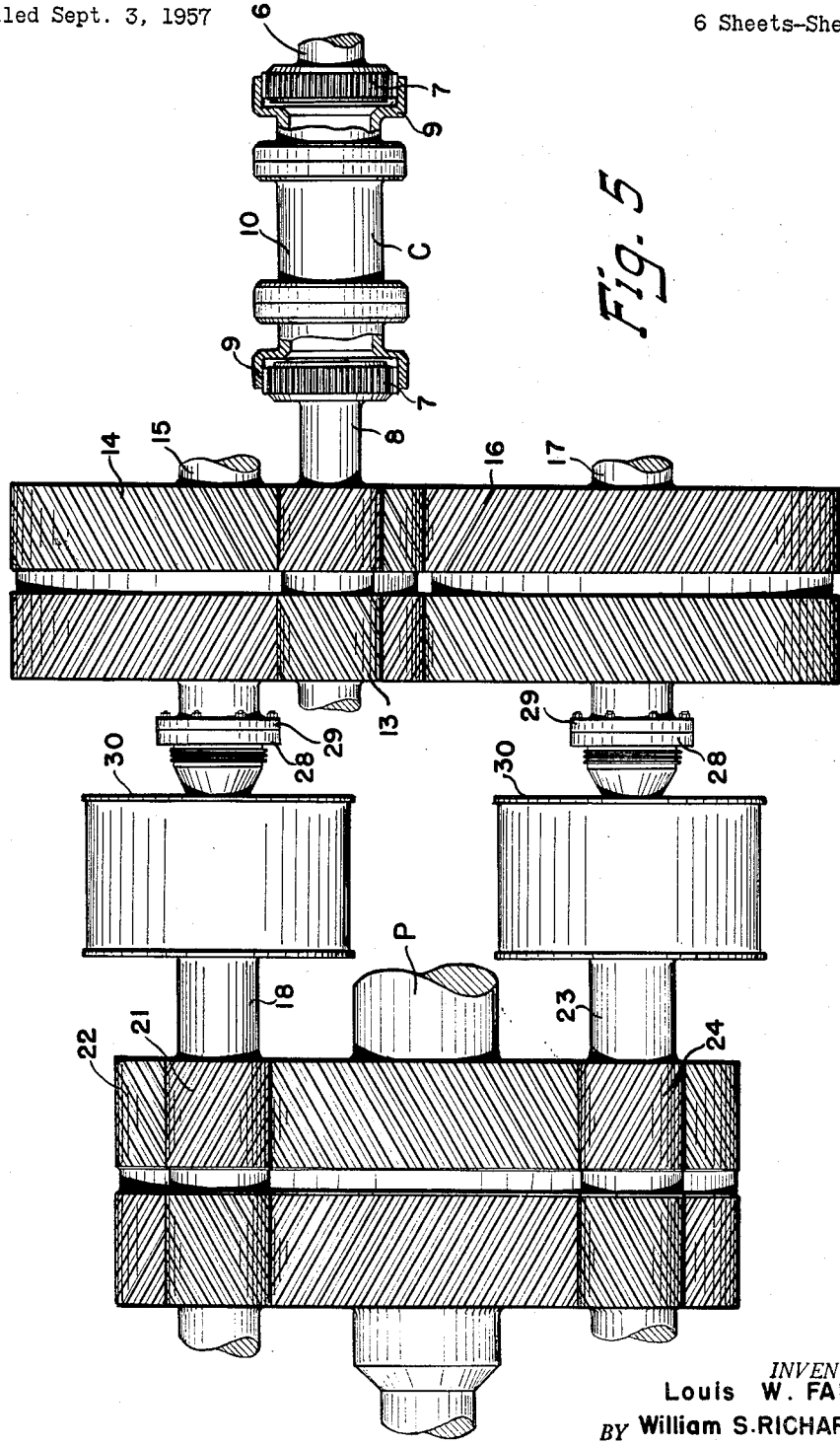

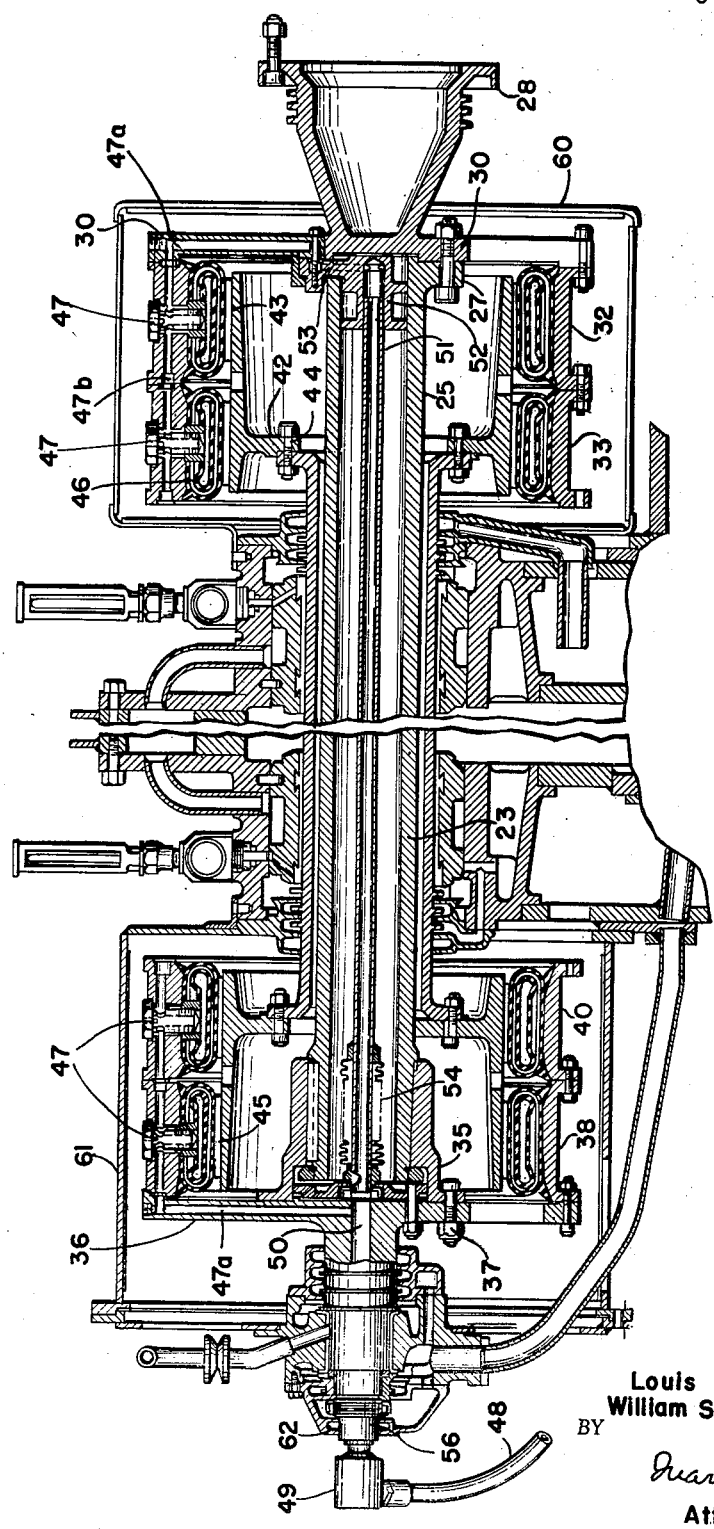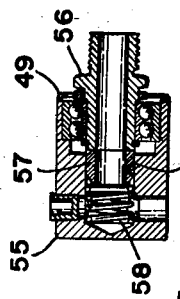

United States Patent Office 2,943,504
Patented July 5, 1960

2,943,504

MARINE REDUCTION GEAR TRANSMISSION

Louis W. Falk, Shorewood, and William S. Richardson, Fox Point, Wis., assignors to The Falk Corporation, Milwaukee, Wis., a corporation of Wisconsin Filed Sept. 3, 1957, Ser. No. 681,613

3 Claims. (Cl. 74—361)

The invention relates to ship propulsion machinery and more particularly to reduction gear transmission between the prime mover and the propeller shaft.

The main object of the invention is to provide a marine reduction gear transmission of compact construction and of narrow athwartship width receiving power from a unidirectional prime mover and transmitting the same through ahead and astern gear trains alternately established by means of suitable clutches.

A further object of the invention is to provide a marine reduction gear transmission in which a primary gear train selectively drives a secondary gear train through a series of clutches, preferably air operated clutches, there being sets of clutches on each side of the drive pinion for ahead propulsion and sets of clutches on each side of the drive pinion for astern propulsion whereby the desired SHP can be transmitted within the available space and the clutches are of a practical size. By distributing the driving load in each instance over a multiplicity of clutches space requirements, lower initial cost and ease of maintenance of the clutch units is obtained.

The propulsion unit embodying the features of this invention can be used for a single screw ship or used as a pair for twin screw ships.

The invention further consists in the several features hereinafter described and more particularly defined by claims at the conclusion hereof.

In the drawings:

Fig. 5 is a diagrammatic view of the gear train;

Fig. 6 is an enlarged section of parts shown in Fig. 4;

Fig. 7 is a vertical sectional view through the rotary air joint connector.

The propulsion unit includes a prime mover, a primary reduction gear train including forward and reverse shafts, secondary reduction gear trains operatively connected with the propeller shaft P, and clutch means for selectively connecting forward and reverse shafts in driving relation with the secondary gear trains.

Figure 1:
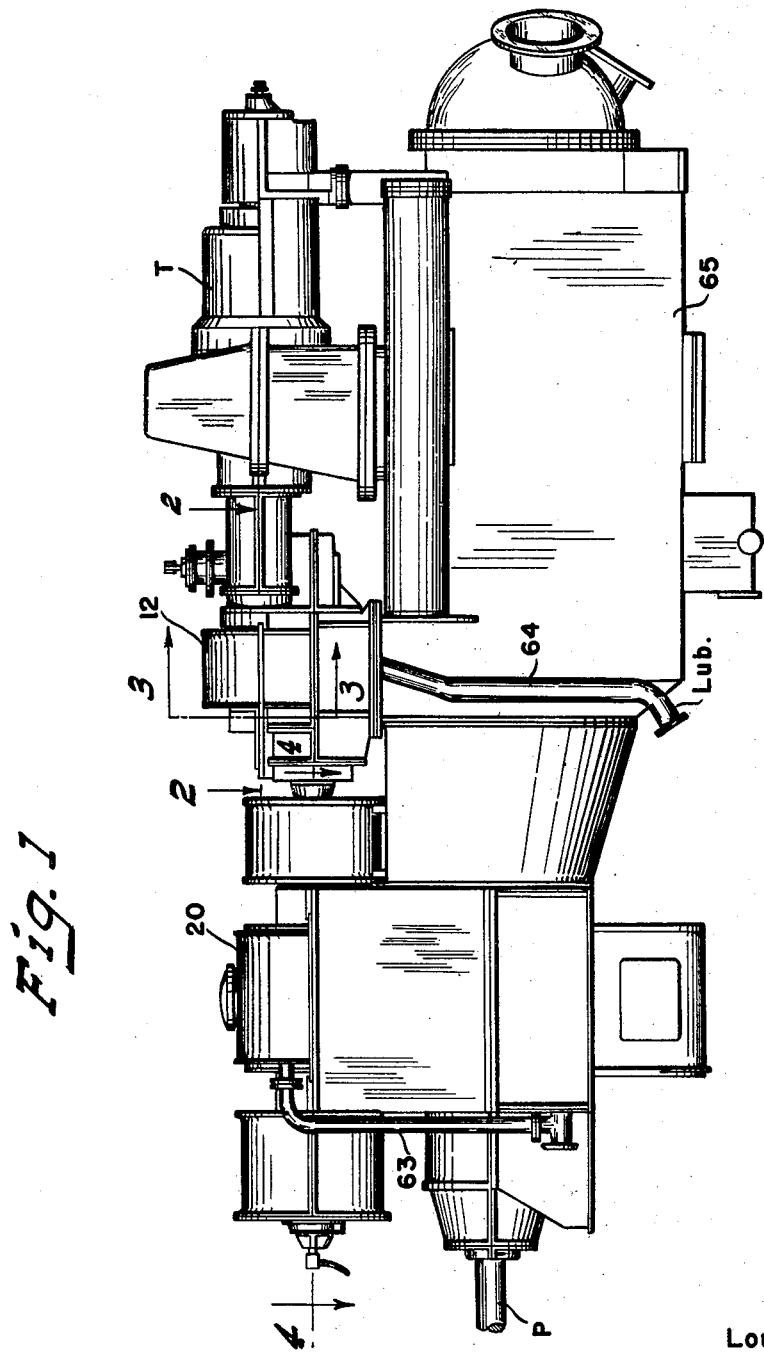
Fig. 1 is an elevation of a propulsion unit provided with reduction gear transmission embodying the invention.
Figure 2:
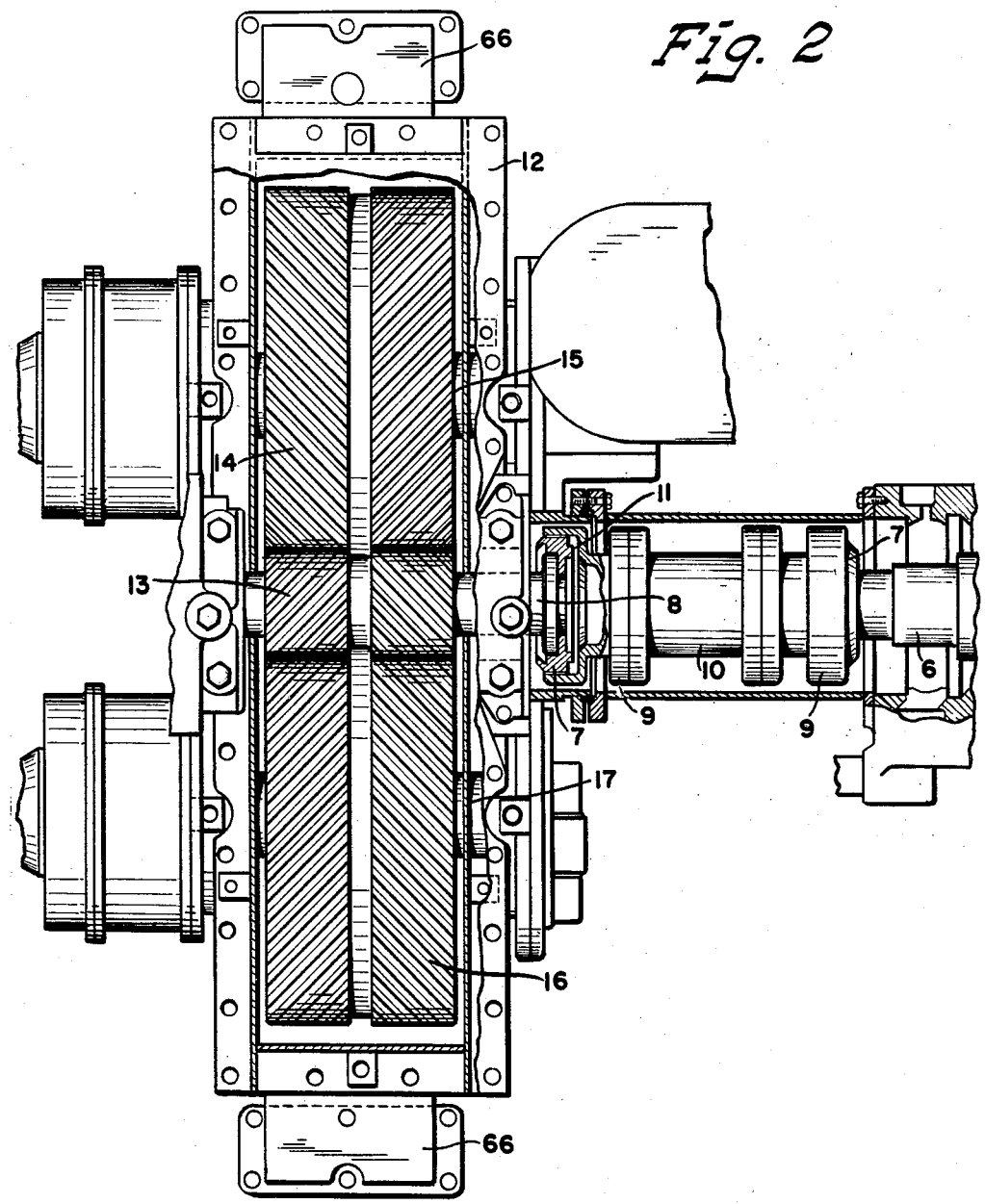
Fig. 2 is a detailed horizontal sectional view taken on the line 2—2 of Fig. 1.

Referring to Fig. 1, the propulsion unit shown herein, as an example, includes a steam turbine T having its driven shaft 6 connected by a double articulated coupling C shown in Figs. 2 and 5 and comprising two externally toothed rings 7 secured respectively to the turbine shaft 6 and a pinion shaft 8, and a floating assembly of two internally toothed sleeves 9 suitably secured to a spacer sleeve 10, and meshing with said rings 7. An annular bumper projection 11 on each ring 7 (one being shown) limits the axial movement of the floating assembly between the flanged portion of sleeves 9 and the rings 7.

Figure 3:
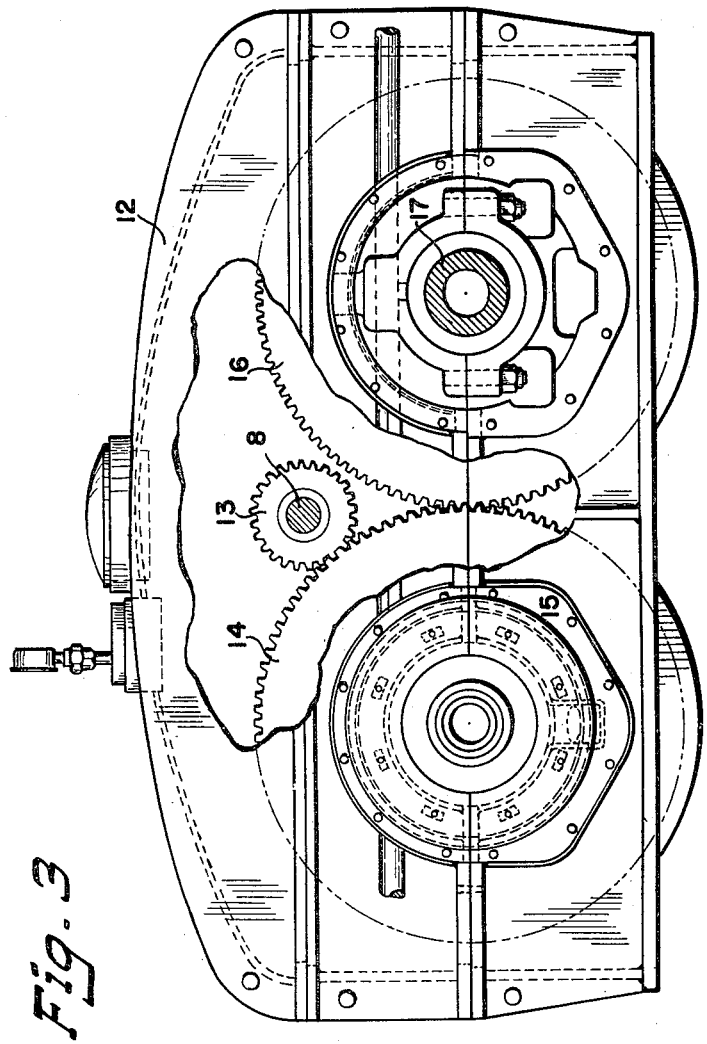
Fig. 3 is a vertical sectional view taken approximately on the line 3—3 of Fig. 1, with the housing being cut open to show the mesh point of certain gears contained therein, and with the oil retainer removed at the right hand shaft portion thereof.

Referring to Figs. 2 and 3, the primary reduction gear unit includes the pinion shaft 8 suitably journaled in a sectional housing 12 and having a pinion 13 mounted or formed thereon and meshing with a driven gear 14 whose shaft 15 is suitably journaled in said housing 12, said gear 14 meshing with a gear 16 whose shaft 17 is also suitably journaled in said housing. It will be noted from Fig. 3, that the bearings for the shafts 15 and 17 are mounted between adjacent split sections of the housing.

Figure 4:
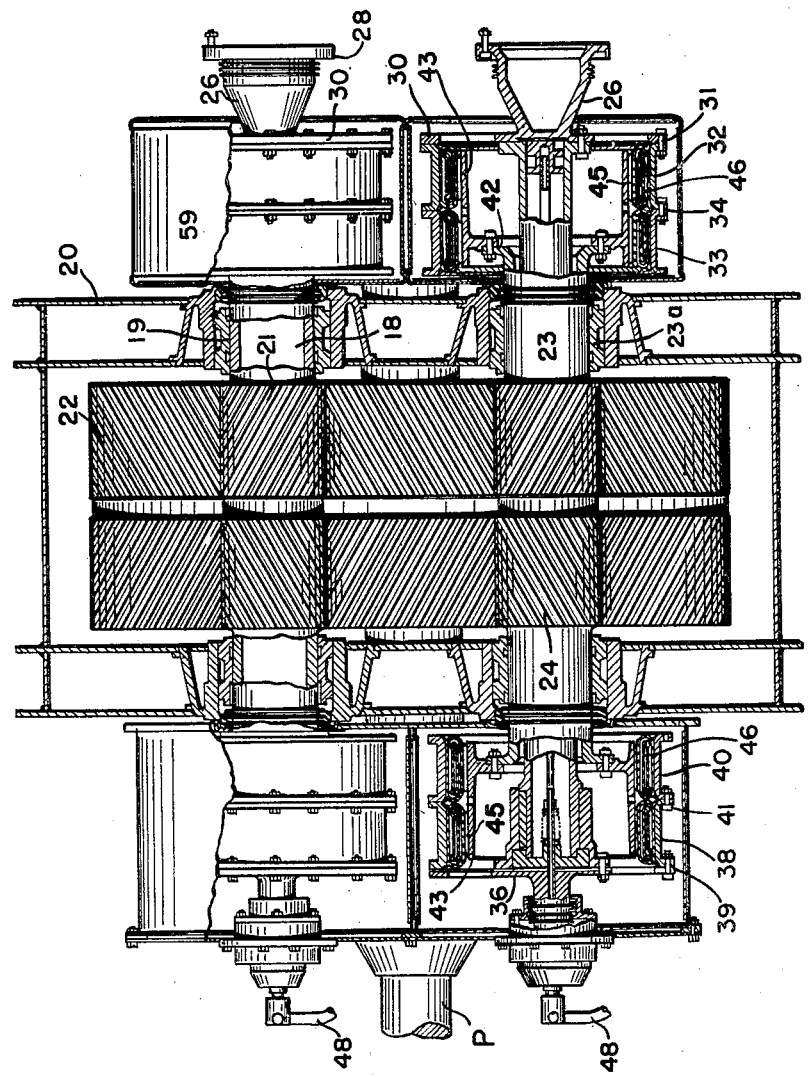
Fig. 4 is a detailed horizontal sectional view taken on the line 4—4 of Fig. 1.

Referring to Figs. 4 and 5, the secondary reduction gear unit includes a drive pinion shaft 18 mounted in bearings 19 in a housing 20 and having a pinion 21 mounted or formed thereon and meshing with a pinion gear 22 on the propeller shaft P, and a drive pinion shaft 23 mounted in bearings 23a in the housing 20 and having a pinion 24 mounted or formed thereon and also meshing with the gear 21 on the propeller shaft P which is also suitably journaled in the housing 20. The shafts 18 and 23 are disposed parallel to each other and in suitably spaced relation and aligned respectively with the shafts 15 and 17.

Referring to Fig. 4, the shafts 18 and 23 are hollow and a hollow quill shaft 25 extends through the hollow of each shaft and projects beyond each end of the same. Each quill shaft 25 has a coupling fitting section 26, bolted to its flanged end 27, and having a cup shaped flanged end 28 for bolting to the flanged end 29 of the extended end of either the shaft 15 or the shaft 17 and also having a clutch spider 30 formed integral therewith to the peripheral portion of which is secured by bolts 31 an annular channel section clutch mounting member 32 to which a similar clutch mounting member 33 is secured by bolts 34. The other end of the quill shaft 25 has a flanged hub 35 non-rotatably secured thereto to which a clutch spider 36 is secured by bolts 37. Spider 36 has an annular channel section clutch mounting member 38 secured thereto by bolts 39 to which a similar clutch mounting member 40 is secured by bolts 41.

Each of the shafts 18 and 23, as shown in connection with shaft 23, have flanged ends 42 at their extended portions and a clutch drum 43 is secured to each of these ends 42 by bolts 44. Each clutch drum is adapted to be engaged by sets of clutch bands 45. Each band 45 comprises a series of arcuate clutch plates suitably mounted on the face or inner side of a pneumatic tube 46 whose opposite side is bonded to one of the channel members, such as the channel members 32, 33, 38 and 40 and each tube is provided with an air supply and exhaust passage 47. Each of these passages for one set of clutches connects with aligned connecting passages 47b in the associated channel members which are connected with an air passage 47a in each of the spiders 30 and 36. An air supply and exhaust pipe 48 for each set of clutches connects with a rotary air joint 49 which connects with a central passage 50 in each spider 36 that connects directly with its passage 47a and with a tube 51 mounted in and extending centrally of the hollow quill shaft 25 and connected at its outer end to a fitting 52 having an air passage 53 connecting with the air passage 47a in the spider 30. A flexible bellows joint 54 near the aft end of the air tube 51 accommodates differential temperature expansion between the quill and the tube.

The rotary air joint shown in Fig. 7 includes a housing 55 fixed against rotation by the pipe 48 which connects with a bore 55a communicating with the outer end of the apertured shaft extension 56 of the spider 36 on which it is journaled and having a carbon seat 57 urged by a spring 58 against the end of said extension 56. With the above construction when compressed air is selectively admitted to either of the pipes 48 supplying the clutches for the shaft 18 or the shaft 23, the tubes 46 of these clutches are inflated to bring the clutch bands 45 of the clutches into driving engagement with their associated drums 43 so that the selected shaft of the shafts 18 or 23 is driven from the primary unit through the quill shaft assembly and the clutches. The inlet and release of compressed air from the clutches is through suitable control valve mechanism, not shown, controlling each pipe 48. Thus, depending upon which of the sets of clutches are energized, will depend the direction of rotation of the propeller shaft P. For forward or ahead drive, the clutches for engaging the shaft 18 are inflated the drive then being the unidirectionally driven pinion 13, gear 14, shaft 15 and its associated quill and clutches, shaft 18 and its pinion 21 and propeller drive shaft gear 22. Under these conditions, the gear 16 and shaft 17 with its associated quill shaft assembly run idle. For astern drive, the clutches for engaging the shaft 23 are inflated, the drive then being the pinion 13, gear 14, gear 16, shaft 17 and its associated quill and clutches, shaft 23 and its pinion 24 and propeller drive shaft gear 22. The clutch elements associated with the drive pinion shaft 18, its pinion 21 and the pinion gear 22 then run idle.

Where the shafts 8, 15 and 17 extend through the housing 12 suitable oil seals, not shown, are provided so that the housing forms an oil reservoir for the gears mounted therein. The shafts 18 and 23 where they project through the housing 20 are provided with oil seals 59 and similar oil seals are provided for the propeller shaft P so that housing 20 forms an oil reservoir for the gears mounted therein and each of clutch assemblies is mounted in a fixed housing 60, the aft housing 61 having a suitable oil seal 62 for the projecting end of the spiders 36 so that the clutches therein rotate in oil supplied to these housings. In Fig. 1, we have shown oil supply piping 63 for the housing 20 and an oil supply pipe 64 for the housing 12 and the steam turbine T is shown as mounted in a steam condenser 65, though it will be understood that any other suitable prime mover such as a gas turbine or an oil engine may be used.

It will be noted that the athwartship width of the propulsion unit is determined at its widest point by the width of the housing 12 and its side platforms 66 but is such that the unit can be readily used in either a single or double screw ship. The gears 14 and 16 are preferably of the same size so that the propeller shaft may be given the same speed when rotated in either direction by the selective control of the clutches.

The reduction gears 13, 14 and 16 and the reduction gears 21, 22 and 23 have double helical teeth of involute profile with a narrow gap separating right and left hand helices, as shown.

We desire it to be understood that this invention is not to be limited to any particular form or relation of parts except insofar as such limitations are included in the appended claims.

We claim:

1. In a marine reduction gearing, the combination of a primary gear reduction unit, including a pair of intermeshing gears adapted for arrangement in athwartship spaced relation and having shaft extensions disposed in parallel, and a unidirectional prime-mover-driven pinion meshing with one of said gears, a secondary gear reduction unit including a pair of spaced pinions aligned respectively with said shaft extensions, said pair of pinions each having a hollow pinion shaft and each being journalled at its ends in a fixed housing and having extended ends, a quill shaft directly connected to one of the shaft extensions of the primary unit and extending through and outwardly from opposite ends of said hollow pinion shaft, and selective drive connections between said primary and secondary unit comprising sets of clutches each respectively comprising a hollow drum disposed at each extended end of said hollow pinion shaft and arranged to rotate therewith, clutch elements mounted on the outer exposed ends of said quill shaft and interiorly of a respective hollow drum, and radially expansible-contractible means arranged to concurrently connect and disconnect the respective clutch elements of a respective set of clutches with their associated drum, whereby said clutches may be operated in tandem to simultaneously drive a respective one of said pinions from opposite ends of its associated hollow shaft.

2. In a marine reduction gearing, the combination of a primary gear reduction unit, including a pair of intermeshing gears adapted for arrangement in athwartship spaced relation and having shaft extensions disposed in parallel, and a unidirectional prime-mover-driven pinion meshing with one of said gears, a secondary gear reduction unit including a pair of spaced pinions aligned respectively with said shaft extensions, said pair of pinions each having a hollow pinion shaft and each being journalled at its ends in a fixed housing and having extended ends, a hollow quill shaft directly connected to one of the shaft extensions of the primary unit and extending through and outwardly from opposite ends of said hollow pinion shaft, and selective drive connections between said primary and secondary unit comprising sets of clutches each respectively comprising a drum disposed at each extended end of said hollow pinion shaft and arranged to rotate therewith, clutch elements mounted on the outer exposed ends of said quill shaft, inflatable pneumatic clutch bands for each clutch of said sets arranged to operatively connect the respective clutch elements with their associated drum, and means for selectively supplying air through said hollow quill shaft concurrently to the inflatable clutch bands of respective sets of clutches associated with said shaft, whereby said clutches may be operated in tandem to simultaneously drive a respective one of said pinions from opposite ends of its associated hollow shaft.

3. In a marine reduction gearing, the combination of a primary gear reduction unit, including a pair of intermeshing gears adapted for arrangement in athwartship spaced relation and having shaft extensions disposed in parallel, and a unidirectional prime-mover-driven pinion meshing with one of said gears, a secondary gear reduction unit including a pair of spaced pinions aligned respectively with said shaft extensions, said pair of pinions each having a hollow pinion shaft and each being journalled at its ends in a fixed housing and having extended ends, a hollow quill shaft directly connected to one of the shaft extensions of the primary unit and extending through and outwardly from opposite ends of said hollow pinion shaft, and selective drive connections between said primary and secondary unit comprising sets of clutches each respectively comprising a drum disposed at each extended end of said hollow pinion shaft and arranged to rotate therewith, clutch elements mounted on the outer exposed ends of said quill shaft, inflatable pneumatic clutch bands for each clutch of said sets arranged to operatively connect the respective clutch elements with their associated drum, conduit means in said clutches for supplying air to said clutch bands, and an air supply tube disposed interiorly of said hollow quill shaft and communicating with said clutch air conduit means to concurrently supply air to the inflatable clutch bands of respective sets of clutches associated with said shaft, and stationary air supply fitting in rotatable connection with said air supply tube, whereby said clutches may be air operated in tandem to simultaneously drive a respective one of said pinions from opposite ends of its associated hollow shaft.

References Cited in the file of this patent

UNITED STATES PATENTS

| | | |
|---|---|---|
| 1,364,325 | Sitney | Jan. 4, 1921 |
| 2,304,030 | Schmitter | Dec. 1, 1942 |
| 2,304,032 | Schmitter | Dec. 1, 1942 |
| 2,527,281 | Varcoe | Oct. 24, 1950 |
| 2,618,164 | Schneider | Nov. 18, 1952 |